US009652303B2

(12) United States Patent
McKeeth

(10) Patent No.: US 9,652,303 B2
(45) Date of Patent: *May 16, 2017

(54) COMMAND LINE OUTPUT REDIRECTION

(71) Applicant: Micron Technology, Inc., Boise, ID (US)

(72) Inventor: James McKeeth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,609

(22) Filed: May 23, 2014

(65) Prior Publication Data
US 2014/0344833 A1    Nov. 20, 2014

Related U.S. Application Data

(63) Continuation of application No. 13/111,775, filed on May 19, 2011, now Pat. No. 8,739,122, and a continuation-in-part of application No. 09/449,782, filed on Nov. 26, 1999, now Pat. No. 7,958,491.

(51) Int. Cl.
  *G06F 9/44* (2006.01)
  *G06F 9/54* (2006.01)
  *G06F 12/02* (2006.01)
(52) U.S. Cl.
  CPC ............... *G06F 9/54* (2013.01); *G06F 9/544* (2013.01); *G06F 12/023* (2013.01); *G06F 2212/251* (2013.01)
(58) Field of Classification Search
  None
  See application file for complete search history.

(56) References Cited

U.S. PATENT DOCUMENTS

| 5,305,461 | A | * | 4/1994 | Feigenbaum et al. ........ 712/225 |
| 5,664,153 | A | | 9/1997 | Farrell |
| 5,745,669 | A | | 4/1998 | Hugard et al. |
| 5,758,154 | A | * | 5/1998 | Qureshi ........................... 713/1 |
| 5,848,025 | A | | 12/1998 | Marietta et al. |
| 5,862,379 | A | | 1/1999 | Rubin et al. |
| 5,890,159 | A | * | 3/1999 | Sealby et al. |
| 5,983,325 | A | | 11/1999 | Lewchuk |
| 6,052,134 | A | | 4/2000 | Foster |

(Continued)

OTHER PUBLICATIONS

Robichaux,Paul "Administering the Windows NT Registry" Chapter 8, Managing the Windows NT Registry, 1998, Available at <http://technet.micorsoft.com/en-us/library/cc749939.aspx>.

(Continued)

Primary Examiner — Matthew Brophy
(74) Attorney, Agent, or Firm — Fletcher Yoder, P.C.

(57) ABSTRACT

In one embodiment the invention provides a method. The method includes invoking, via an application, a call of a command line utility; providing, via the application, an identifier in the call of the command line utility, wherein the identifier comprises an operating system controlled memory location; storing output from the command line utility in operating system shared memory at the operating system controlled memory location identified by the identifier; and retrieving, by the application, the command line utility output from the operating system shared memory at the operating system controlled memory location identified by the identifier.

20 Claims, 4 Drawing Sheets

(56) References Cited

U.S. PATENT DOCUMENTS

| | | | |
|---|---|---|---|
| 6,052,756 A | 4/2000 | Barnaby et al. | |
| 6,061,253 A | 5/2000 | Igarashi et al. | |
| 6,093,215 A | 7/2000 | Buxton et al. | |
| 6,141,792 A | 10/2000 | Acker et al. | |
| 6,151,701 A | 11/2000 | Humphreys et al. | |
| 6,177,939 B1 * | 1/2001 | Blish et al. | 715/770 |
| 6,179,489 B1 * | 1/2001 | So et al. | 718/102 |
| 6,182,279 B1 * | 1/2001 | Buxton | 717/100 |
| 6,199,138 B1 | 3/2001 | Jeddeloh | |
| 6,212,577 B1 | 4/2001 | Stern et al. | |
| 6,212,598 B1 | 4/2001 | Jeddeloh | |
| 6,282,697 B1 * | 8/2001 | Fables et al. | 717/107 |
| 6,332,219 B1 * | 12/2001 | Curtis et al. | 717/170 |
| 6,338,148 B1 * | 1/2002 | Gillenwater et al. | 714/25 |
| 6,347,331 B1 * | 2/2002 | Dutcher et al. | 709/203 |
| 6,385,766 B1 * | 5/2002 | Doran et al. | 717/174 |
| 6,405,362 B1 * | 6/2002 | Shih et al. | 717/174 |
| 6,449,642 B2 * | 9/2002 | Bourke-Dunphy et al. | 709/222 |
| 6,535,930 B2 | 3/2003 | Stern et al. | |
| 6,681,265 B1 * | 1/2004 | Hlava | 719/328 |

OTHER PUBLICATIONS

Hill, Tim. "The Windows NT Command Shell," Windows NT Shell Scripting, Copyright 1998, MacMillian Technical Publishing, (retrieved Jul. 15, 2012, available at http://technet.microsoft.com/en-us/library/cc723564.aspx#XSLTsection127121120120).

"Internet Component Download," Microsoft Corporation, Jan. 1996, http://www.graphcomp.com/info/specs/me/CODEDWLD.HTM.

"Microsoft Computer Dictionary Fifth Edition," p. 111 & 544, 2002, Microsoft Press, retrieved Dec. 15, 2004.

"Programming the Win32 Registry," http://www.geocities.com/SiliconValley/2072/prgw32rg.htm?20067.

"Using Command-Line Utilities," p. E1 #12, retrieved Dec. 15, 2004, www.cisco.com/univercd/cc/td/doc/product/rtmgmt/sw_nt-man/td_main/td_5_8/traf5_8/cmdline.pdf.

"Windows 95 Application Setup Guidelines for Independent Software Vendors" 1995, http://msdn.microsoft.com/library/tech art/setup.htm.

"Windows 95 Secrets, 3rd Edition", p. 315, 1995, "The DOS Version of the Registry Editor", retrieved Dec. 15, 2004.

"Windows registry", Wikipedia; http://en.wikipedia.org.wiki/Windows_Registry, retrieved from google.com search Jan. 31, 2006.

Dietel, H.M.: "Operating Systems", (1990), p. 574, command line and redirection, p. 644, redirected output, output of a command piped to another command.

Hill, Tim; "The Windows NT Command Shell", 1998, retrieved from URL http://www.microsoft.com/technet/archive/winntas/deploy/prodspecs/shellscr.mspx?mfr=true on Oct. 15, 2007.

Kochan, Stephen G., Wood, Patrick H., Exploring the UNIX System Second Edition, 1989, p. 11, p. 81-84, p. 103-111.

Russinovich, Mark, "inside the Windows NT Registry", Apr. 1997, Windows NT Magazine, retrieved from http://www.winnetmag.com/Articles/Index.cfm?ArticleID=22, retrieved on Aug. 14, 2002.

Weber Systems, Inc. Staff, "UNIX User's Handbook", 1985, p. 170-177.

Geoffrey J. Noer, Cygwin21: A free Win32 porting layer for UNIX application. In proceedings of the 2nd USENIX Windows NT Symposium, Seattle, WA, USA, Aug. 1998, USENIX Association.

David G. Korn, Porting UNIX to Windows, NT. In proceedings of the USENIX 1997 Annual Technical Conference, Anaheim, CA, USA, Jan. 1997, USENIX, Association.

\* cited by examiner

COMMAND LINE OUTPUT REDIRECTION

CROSS-REFERENCE TO RELATED APPLICATION

This application is a continuation of U.S. patent application Ser. No. 13/111,775, filed on May 19, 2011, which is a continuation of U.S. patent application Ser. No. 09/449,782, which was filed on Nov. 26, 1999.

BACKGROUND

The invention relates generally to computer system support of application program execution and, more particularly but not by way of limitation, to a method and apparatus for redirecting command line utility output to a non-application maintained storage location.

Many applications such as word processing and file viewing programs have occasion to access system information. Often, such system information is available only through command line (e.g., console) utilities. That is, utilities that are accessible only through a command line interface. Illustrative command line utilities include "dir" and "net view" commands available in the Microsoft WINDOWS® operating system and the "w" command available in UNIX® and UNIXe-like operating systems (provides a list of users logged onto a specified computer system).

One difficulty with command line utilities is that their output is not generally directly useable by an executing application. The conventional technique by which a user application obtains command line utility output is shown in FIG. 1. After a temporary text file is created (block 100), the command line utility whose output is desired is invoked via a standard interface (block 102). Output from the command line utility is piped to the temporary file (block 104), from which the application extracts and processes the desired data (block 106). Sound programming practice calls for the destruction/removal of the temporary file created in block 100 (block 108). It will be recognized that a temporary file may be created by the piping operation itself, i.e., during the acts of block 104. Nevertheless, the use of a temporary file is generally considered essential.

A problem with the technique of FIG. 1 is that the application invoking the command line utility may not have file creation privileges on the computer system. If this is so, then the application will be unable to obtain the desired data. Another problem is that if the disk the application has access to is full (i.e., incapable of accepting new or enlarged user files), any attempt to create a new file will generate an error. Yet another problem is that the file name chosen for the temporary file may already be in use. Still another problem is that many new PCs are disk-less and, thus, may not provide a mechanism through which user Initiated (i.e., user invoked application) file input-output is possible. A further problem with prior art techniques such as that shown in FIG. 1 is that maintenance of temporary files is left to the calling application. If the application that creates a temporary file fails to remove it, a plethora of useless files may be to generated over time.

Thus, it would be beneficial to provide a mechanism by which an application program may obtain output from a command line utility without the need to create a temporary file.

SUMMARY

In one embodiment the invention provides a method to provide command line utility output to an application without the need of temporary files. The method includes receiving an identifier, receiving output from a command line utility, and storing the command line utility output in a system storage at a location identified by the identifier. In one illustrative embodiment, command line utility output is stored in a system registry database, which is stored in active memory (temporary storage) when the system is active and stored in a file (permanent storage) when the system is inactive. In another illustrative embodiment, command line utility output is stored in a shared system memory. The method may be stored in any media that is readable and executable by a computer system.

DETAILED DESCRIPTION

Figure 2:
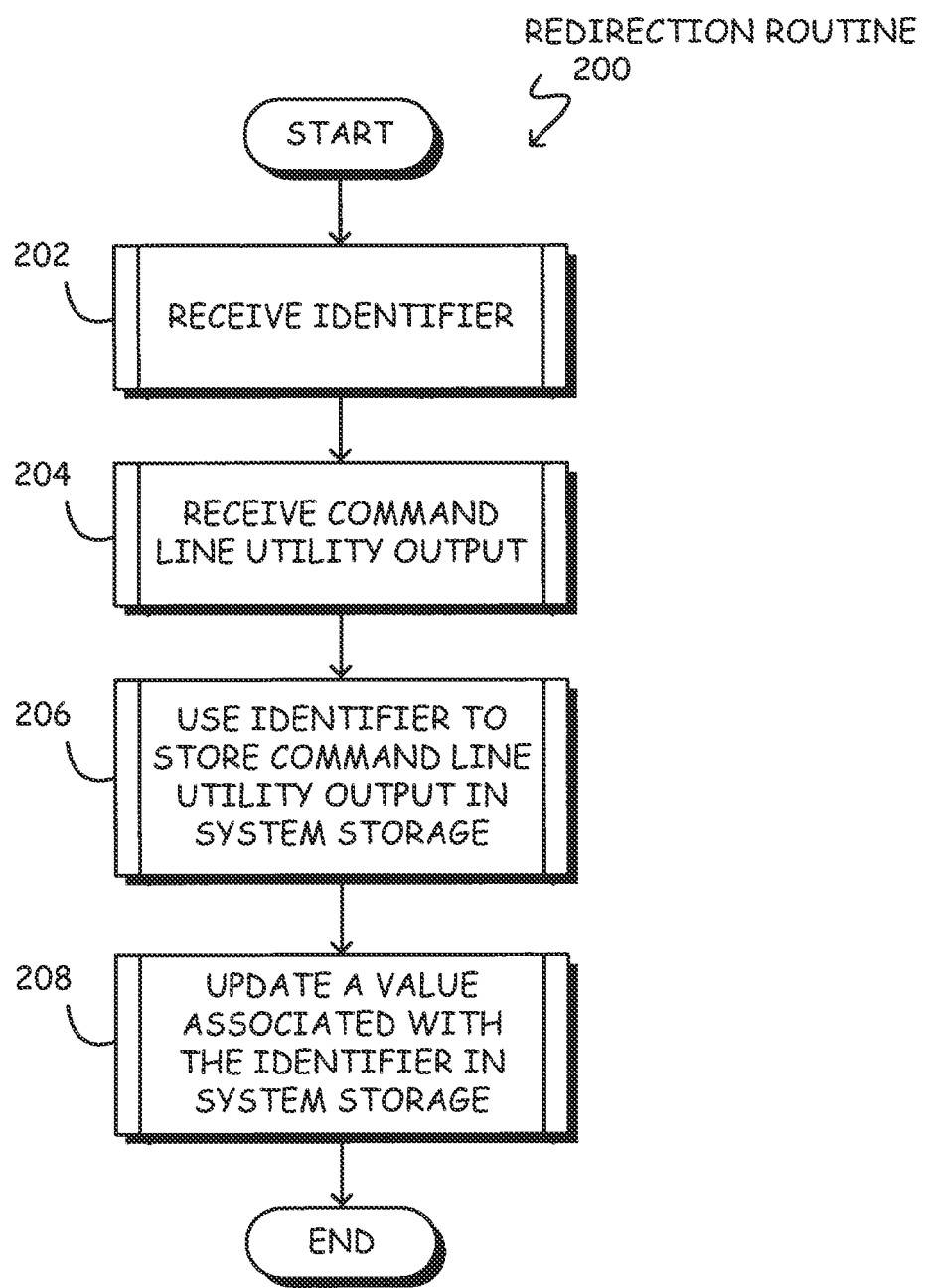
FIG. 2 shows, in flowchart form, the operation of a redirection utility in accordance with one embodiment of the invention.

Referring to FIG. 2, redirection routine 200 in accordance with one embodiment of the invention uses a user/application specified identifier (block 202) to identify command line utility output (block 204) which it stores in a system-wide storage location (block 206). By system-wide, it is meant that the storage location is available to all user applications and is, furthermore, maintained by operation of the underlying operating system. Following the act of storage in block 206, a value associated with the identifier in the system storage is updated to indicate completion of the redirection routine and to, possibly, provide additional information to the calling application such as the amount (e.g., number of lines) of information stored. Once redirection routine 200 completes the act of storing in block 206, the application invoking routine 200 may use the specified identifier to access the stored command line utility output.

Figure 1:
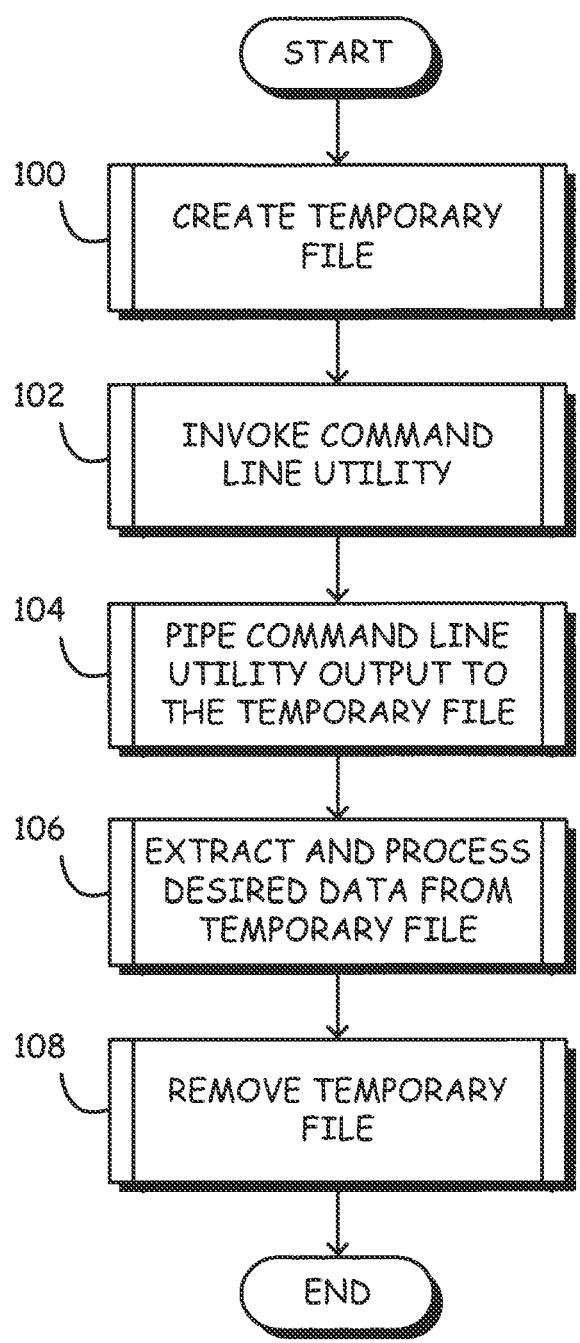
FIG. 1 shows a prior art technique by which an application obtains command line utility output.

One benefit of a redirection routine in accordance with FIG. 2 is that the calling application does not need file creation authority—no temporary files are created. Another benefit is that there is no need for the calling application to remove temporary files as in prior art techniques such as that illustrated in FIG. 1. A corollary of this benefit is that the calling application does not require file deletion authorization. Yet another benefit of a redirection routine in accordance with the invention is that a second application cannot inadvertently destroy the results generated by a first application by accidentally replacing or deleting a temporary file (e.g., a background process designed to remove temporary files).

Still another benefit of the invention is that the application invoking redirection routine 200 does not have to have disk I/O (input-output) authority as the storage location is maintained by the underlying operating system—the application makes I/O calls to the specified storage location through standard system calls (see discussion below).

By way of example, consider a situation in which an executing application needs information of the type provided by command line utility CMD-UTIL, where CMD-UTIL represents any utility executable from a command line prompt (e.g., the "dir" directory command of a Microsoft WINDOWS® operating system or the "head" command of a UNIX® operating system). In accordance with the invention, the application invokes a system call of the form:

CMD-UTIL [PARAM] I REDIRECT ID

Here, [PARAM] represents zero or more parameters that control or modify the execution of the CMD-UTIL utility, the "I" symbol represents the piping function available in many operating systems such as WINDOWS®, UNIX® and derivatives thereof, REDIRECT is the name of routine 200, and ID is one or more parameters which REDIRECT routine 200 associates with output from CMD-UTIL during the act of storage in block 206 of FIG. 2.

It will be recognized that the calling application will generally ensure that the identifier it passes to routine 200 has either not been used or may be reused. It will further be recognized that command utilities may be stacked. That is, output from a first command utility (CMD-UTIL-1, for example) may be piped to a second, third, or Nth command utility (CMD-UTIL-N, for example) which may then be piped to routine 200. In this case, a system call in accordance with the invention would be:

CMD-UTIL-1 [PARAM]| . . . |CMD-UTIL-N [PARAM] |REDIRECT ID, where " . . . " represent one or more commands of the form CMD-UTIL-X [PARAM].

Because many current personal computer systems (PCs) are operated or controlled by one version or another of the Microsoft WINDOWS® operating system, an illustrative embodiment of redirection routine 200 utilizing the WINDOWS® system registry (hereinafter, the registry) will now be given. It will be recognized that the registry is an operating system generated and maintained database which application programs, application setup programs, and the operating system itself use to store configuration information.

Information stored in the registry is organized into hierarchical keys and associated key entries. Current versions of the registry use six predefined root keys (AKA Hives): HKEY_USERS; HKEY.CLASSES.ROOT; HKEY.CURRENT.USER; HKEY.CURRENT.CONFIG; HKEY_LOCAL.MACHINE; and HKEY.DYN.DATA. Each key in the registry can have one or more sub-key entries. Each key and sub-key can have one or more names (a unique character string identifier) and each name can have an associated value (data stored in a defined manor, may be a character string, binary data, a number, a Boolean value, etc.). Each key and sub-key has one default key entry that has no name.

Access to the registry is provided through system calls defined in the registry application programming interface (API). Illustrative registry API functions include: RegEnumKeyEx, which enumerates the sub-keys of a specified key; RegOpenKeyEx, which opens and returns a handle to a specified key; RegEnumValue, which enumerates the key entries associated with a specified key; RegQueryValueEx, which returns the assigned value of a specified key entry; RegSetValueEx, which assigns a value to a specified key entry, creating the key entry if the key entry was not previously registered; RegDeleteKey, which removes a key from the registry; and RegDeleteValue, which removes a key entry from the registry. Using keys (hereinafter understood to include sub-keys) and registry API system calls, routine 200 can store command line utility output in the registry file. Using the same keys, an application program can retrieve information previously stored by routine 200.

Figure 3:
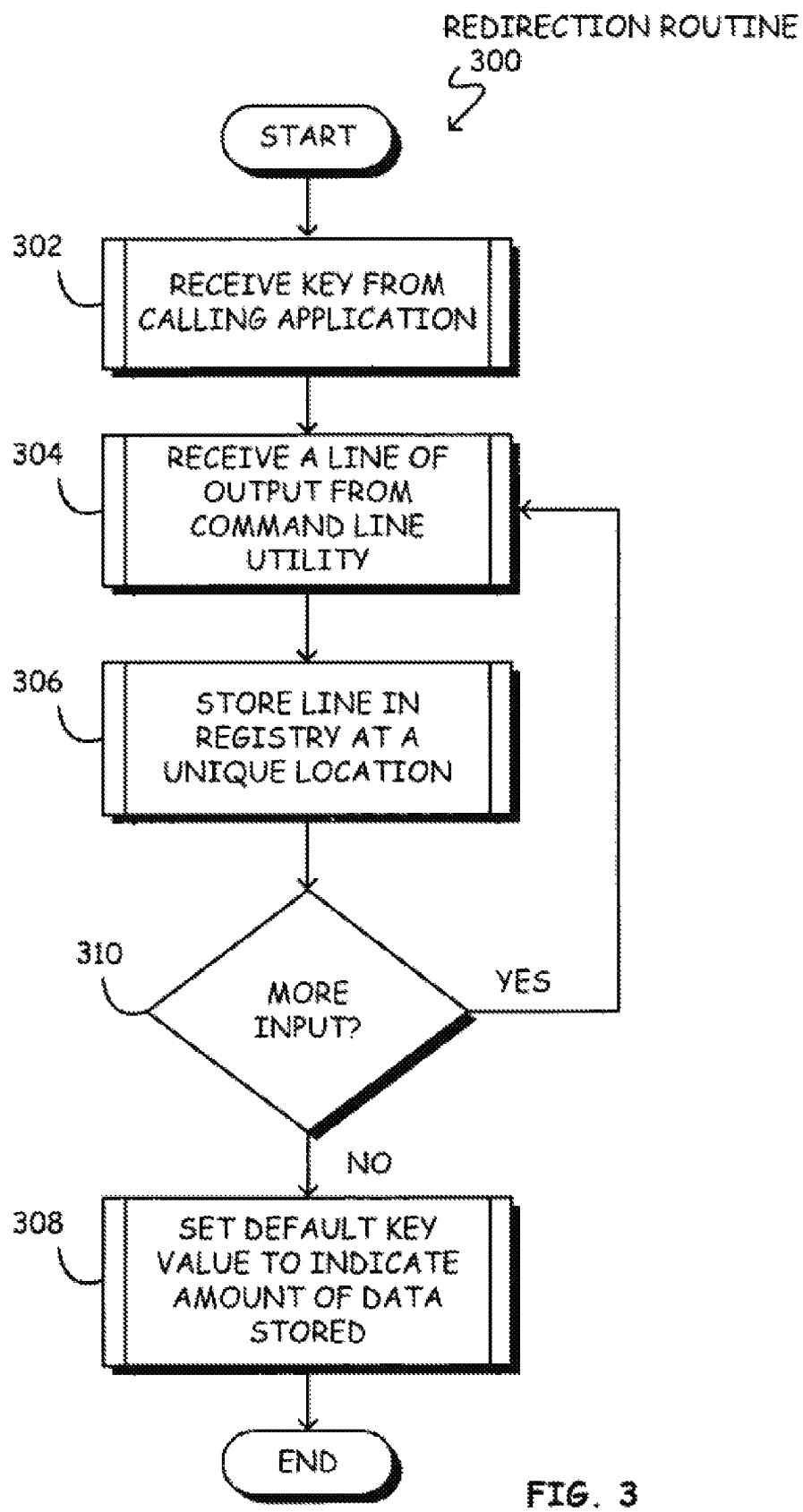
FIG. 3 shows, in flowchart form, the operation of a one specific redirection utility in accordance with FIG. 2.

Referring now to FIG. 3, in one embodiment WINDOWS® based redirection routine 300 receives an identifier comprising a key from a calling application (block 302). An illustrative key is HKEY.DYN.DATA/CMD-UTIL-OUTPUT-KEY. Routine 300 then begins receiving output from the CMD-UTIL utility, generally one line at a time as most command line utilities generate output targeted for line oriented standard output devices such as a computer display (block 304). The received line is stored in the registry at a key name that uniquely identifies the line (block 306). For example, each received line of output may be stored in the registry key:

HKEY. DYN. DATA/CMD-UTIL-OUTPUT-KEY, with a name of "N," where "N" is set equal to 1 for the first received line, 2 for the second received line, and so forth. A test is then made to determine if additional command line utility output is available for storage (diamond 308). If another line of output is available (the "yes" prong of diamond 308), processing continues as block 304. If no more output is available (the "no" prong of diamond 308), the default value of the received key (i.e., HKEY_DYN_DATA/CMD-UTIL-OUTPUT-KEY) is set equal to a value corresponding to the total number of lines received and stored by routine 300 (block 310). On completion, output from the command line utility CMD-UTIL is available for retrieval and manipulation by the calling application without the need to create, maintain or delete a temporary file.

In another embodiment, the ID parameter includes a storage location identifier. One value of the storage location identifier may direct use of the registry (or a similar operating system maintained database) while another value of the storage location identifier may direct use of operating system shared memory (e.g., volatile random access memory). One example of operating system shared memory is the "clipboard" memory maintained by the WINDOWS® operating system.

Figure 4:
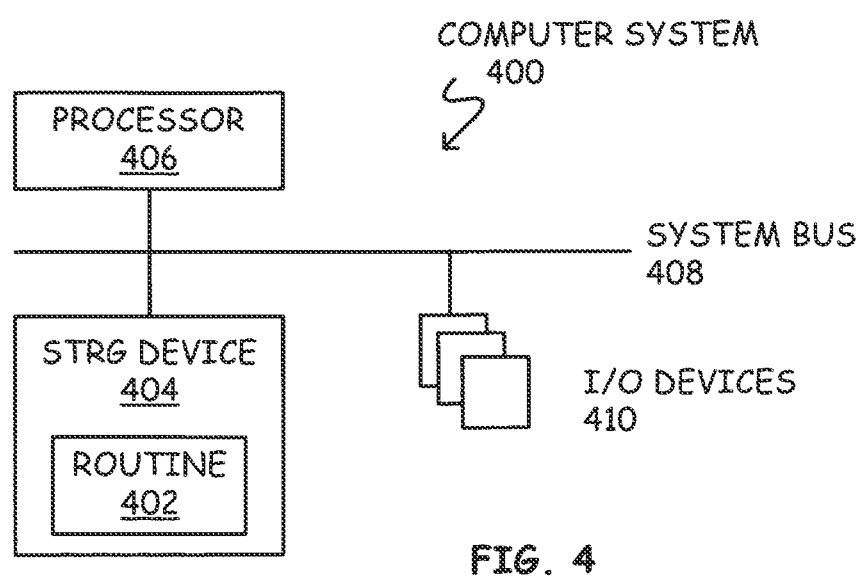
FIG. 4 shows a block diagram of a computer system incorporating a redirection routine in accordance with FIG. 2.

Referring now to FIG. 4, illustrative computer system 400 in accordance with one embodiment of the invention includes redirection routine 400 (e.g., a routine in accordance with 200 and/or 300) to redirect output from a command line utility to a specified operating system controlled memory location. As shown, routine 400 may be retained in storage device 404 which is coupled to processor 406 via system bus 408. It will be understood that storage device 404 may represent non-volatile memory devices or a combination of volatile and non-volatile memory devices. Illustrative non-volatile storage devices include, but not limited to: semiconductor memory devices such as EPROM, EEPROM, and flash devices; magnetic disks (fixed, floppy, and removable); other magnetic media such as tape; and optical media such as CD-ROM disks. It will be further recognized that computer system 400 may incorporate one or more input-output is devices 410 such as one or more secondary bus bridge circuits, memory controllers, accelerated graphics port devices and network interface adapters.

Various changes in the details of the illustrated operational methods as well as in the components of computer system 400 are possible without departing from the scope of the following claims. For instance, instructions to perform the acts of FIGS. 2 and 3 may be embodied in a program module implemented as, for example, a dynamic link library available through a standard interface. In addition, the illustrative system of FIG. 4 may include additional components such as network interface adapters and the like.

Thus, while the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method comprising:

invoking, via an application unable to receive command line utility outputs via a command line interface, a call of a command line utility;

providing, via the application, an identifier as a parameter in a redirection routine call associated with the call of the command line utility, wherein the identifier comprises an operating system controlled memory location, wherein the identifier comprises a first value or a second value;

storing output from the command line utility in operating system shared memory at the operating system controlled memory location identified by the identifier, wherein if the identifier comprises the first value then the memory location comprises a system registry location, and if the identifier comprises the second value the memory location comprises a system clipboard location;

and retrieving, by the application, the command line utility output from the operating system shared memory at the operating system controlled memory location identified by the identifier.

2. The method of claim 1, wherein the operating system controlled memory location is a location of an operating system clipboard.

3. The method of claim 1, wherein the command line utility stores the output in the operating system shared memory location.

4. The method of claim 1, wherein the call of the command line utility is invoked with a piping function.

5. The method of claim 4, wherein the call includes the operating system controlled memory location as a parameter.

6. The method of claim 4, comprising piping the command line utility output in the operating system to a redirection routine.

7. The method of claim 6, comprising redirecting, via the redirection routine, the output to the operating system shared memory.

8. The method of claim 1, comprising invoking the call, wherein the call comprises a piping to a redirection routine tasked with storing the output in the operating system shared memory.

9. The method of claim 8, wherein the redirection routine stores the output in the operating system shared memory based upon the operating system controlled memory location.

10. The method of claim 1, comprising: ensuring, via the application, that the provided identifier has either not been used or may be reused.

11. A tangible, non-transitory, machine-readable medium, comprising a machine-executable routine to:

interpret an identifier parameter provided in a redirection routine call associated with a command line utility call invoked from an application that is unable to receive command line utility outputs via a command line interface, the identifier comprising an operating system controlled memory location, wherein the identifier comprises a first value or a second value;

receive output from a command line utility invoked by the command line utility call;

and store the output in operating system shared memory at the operating system controlled memory location for subsequent retrieval by the application, wherein if the identifier comprises the first value then the memory location comprises a system registry location, and if the identifier comprises the second value the memory location comprises a system clipboard location.

12. The machine-readable medium of claim 11, comprising machine-readable instructions to: cause an application needing the command line utility output to issue the command line utility call.

13. The machine-readable medium of claim 12, wherein the command line utility call comprises: an indication of the command line utility; a redirection routine configured to redirect the command line utility output based upon the identifier; and a piping function call configured to direct the output of the command line utility as an input to the redirection routine.

14. The machine-readable medium of claim 11, wherein the output is received and stored line-by-line until no additional output is left to be received and stored.

15. The machine-readable medium of claim 13, wherein the command line utility call is in a format comprising: [CMD-UTIL] [I] [REDIRECT] [ID]; wherein [CMD-UTIL] is the name of the command line utility to be executed; wherein [I] is a reference to the piping function; wherein [REDIRECT] is the name of the redirection routine; and wherein [ID] is the identifier.

16. The machine-readable medium of claim 11, wherein the operating system controlled memory location is a location of an operating system clipboard.

17. A computer system, comprising:

a processor;

non-transitory, machine-readable storage;

a command line utility stored on the storage, wherein the command line utility is a utility executable from a command line prompt by the processor;

an application stored on the storage, executable by the processor, wherein the application is unable to receive command line utility outputs via a command line interface and is configured to:

call the command line utility, provide an identifier as a parameter in a redirection routine call associated with in the call of the command line utility, the identifier comprising an operating system controlled memory location, wherein the identifier comprises a first value or a second value, and retrieve an output of the command line utility at the operating system controlled memory location;

and a redirection routine stored on the storage, executable by the processor, wherein the redirection routine is configured to: receive, as a parameter, the identifier, receive, as input, the output of the command line utility, and store the output of the command line utility to the operating system controlled memory location based on the identifier, wherein if the identifier comprises the first value then the memory location comprises a system registry location, and if the identifier comprises the second value the memory location comprises a system clipboard location.

18. The system of claim 17, wherein the application is configured to call a plurality of command line utilities, wherein the plurality of command line utilities are piped together and an output of the plurality of command line utilities is piped to redirection routine.

19. The system of claim 17, configured to enable the application to retrieve the output of the command line utility without the use of any temporary files.

20. The system of claim 17, wherein the output is received and stored line-by-line until no additional output is left to be received and stored.

* * * * *